United States Patent [19]
Takeuchi et al.

[11] Patent Number: 5,714,924
[45] Date of Patent: Feb. 3, 1998

[54] POSITIVE CHARACTERISTIC THERMISTOR DEVICE

[75] Inventors: Michikazu Takeuchi, Nikahomachi; Kazuo Saito, Kisakatamachi, both of Japan

[73] Assignee: TDK Corporation, Tokyo, Japan

[21] Appl. No.: 590,738

[22] Filed: Jan. 24, 1996

[30] Foreign Application Priority Data

Jan. 27, 1995 [JP] Japan .................... 7-011104

[51] Int. Cl.$^6$ .................................... H01L 7/10
[52] U.S. Cl. .................. 338/22 R; 174/52.3; 174/52.6; 338/220; 338/221; 338/225 D; 338/276; 338/237; 361/728
[58] Field of Search .............. 338/22 R, 225 D, 338/232, 234, 235, 220, 221, 237, 273, 274, 276; 174/52.3, 52.6; 361/679, 728

[56] References Cited

U.S. PATENT DOCUMENTS

| | | | |
|---|---|---|---|
| 2,265,821 | 3/1941 | Siegel | 338/237 |
| 3,182,238 | 5/1965 | Toder et al. | 174/52.3 |
| 3,750,082 | 7/1973 | Petersen et al. | 338/220 |
| 3,839,623 | 10/1974 | Portmann | 219/541 |
| 3,925,748 | 12/1975 | Slocum | 338/232 |
| 4,250,534 | 2/1981 | Brown et al. | 174/52.3 |
| 4,395,623 | 7/1983 | Shimada et al. | 219/544 |
| 4,894,637 | 1/1990 | Yamada et al. | 338/22 R |
| 5,117,089 | 5/1992 | Honkomp et al. | 219/201 |
| 5,153,555 | 10/1992 | Enomoto et al. | 338/22 R |
| 5,233,326 | 8/1993 | Motoyoshi | 338/22 R |

FOREIGN PATENT DOCUMENTS

| | | | |
|---|---|---|---|
| 3-93202A | 4/1991 | Japan | 338/22 R |
| 4-94702 | 8/1992 | Japan . | |
| 5-73903 | 10/1993 | Japan . | |
| 2002176 | 2/1979 | United Kingdom | 338/22 R |

*Primary Examiner*—Teresa J. Walberg
*Assistant Examiner*—Karl Easthorn
*Attorney, Agent, or Firm*—Oblon, Spivak, McClelland, Maier & Neustadt, P.C.

[57] ABSTRACT

The internal space of the case is divided into first housing portions and a second housing portion separated from the first housing portions by a partitioning wall. A positive characteristic thermistor element is housed in the second housing portion. At least two terminal members are provided, each with a contact terminal portion, a conductive portion and a lead-out terminal portion. The contact terminal portions are positioned in the second housing portion each in contact with one of the electrodes of the positive characteristic thermistor element. The conductive portions are electrically continuous to the contact terminal portions and are led to the first housing portions through the partitioning wall. The lead-out terminal portions positioned in the first housing portions, are electrically connected to the conductive portions and led out to the outside at the first housing portions. The second housing portion, where the positive characteristic thermistor element is positioned, is cut off from the atmospheres in the first housing portions.

8 Claims, 6 Drawing Sheets

31 or 32

5,714,924

POSITIVE CHARACTERISTIC THERMISTOR DEVICE

BACKGROUND OF THE INVENTION

1. Field of the Invention

The present invention relates to a positive characteristic thermistor device that employs a positive characteristic thermistor element. The positive characteristic thermistor device according to the present invention is mainly used as a motor start-up relay in electrical appliances such as refrigerators and air conditioning systems.

2. Discussion of Background

Electrical appliances mounted with this type of positive characteristic thermistor device are often used under poor operating conditions. For instance, the environment of the refrigerator in a private home which is normally the kitchen. The kitchen is an environment where chlorine gas generated from the chlorine disinfectants contained in tap water and the chlorine component in kitchen detergents used for dish washing and in bleaches, is present. If chlorine gas thus generated enters the positive characteristic thermistor device mounted in an electrical appliance, degradation of the positive characteristic thermistor element, corrosion of electrode portions, or contact failure may result.

In addition, vinyl chloride wiring, which is often used for connecting the positive characteristic thermistor device to the outside also becomes a source of chlorine gas at high temperatures, causing similar chlorine gas-induced problems.

Furthermore, the positive characteristic thermistor device undergoes a heating and cooling cycle every time the refrigerator compressor starts and stops. In this process, the positive characteristic thermistor device performs a type of breathing function, through which the positive characteristic thermistor device takes in outside air and discharges air contained within it to the outside. Through this breathing action, chlorine gas is taken into the positive characteristic thermistor device. This further increases the likelihood of chlorine gas-induced problems.

Moreover, in a refrigerator mounted with this type of positive characteristic thermistor device, installed in a kitchen or the like, where large quantities of water are used, condensation and the like are likely to occur in the refrigerator itself. Because of this, drops of water and moisture enter the positive characteristic thermistor device, accelerating the process of degradation of the positive characteristic thermistor element and the electrode portions, corrosion, contact failure and the like.

As means for solving such problems, Japanese Unexamined Utility Model Publication (KOKAI) Nos. 94702/1992 and 73903/1993 disclose a technology through which chlorine gas, moisture and drops of water are prevented from entering the case of the positive characteristic thermistor device via the area through which terminals are led out, by filling the area through which terminal members are led out from the case to the outside with resin, thereby sealing the area.

However, a positive characteristic thermistor device has areas other than the terminal lead-out area mentioned above, through which chlorine gas, moisture or drops of water can enter the case. For instance, the case is provided with holes for inserting the compressor plugs on the opposite side from the terminal lead-out area and for these holes, it is not possible to employ the method of sealing the area with resin. Because of this, the likelihood remains of chlorine gas, moisture or drops of water entering the case through these holes.

Also, since a structure in which two casing members are combined to constitute one case is generally adopted, a gap is formed at the bonding surface of the two casing members and there is the likelihood of chlorine gas, moisture or drops of water entering the case through this gap.

SUMMARY OF THE INVENTION

It is the object of the present invention to provide a positive characteristic thermistor device in which degradation of the positive characteristic thermistor element and the electrode portions, corrosion, contact failure and the like can be reliably prevented.

In order to achieve the object described above, the positive characteristic thermistor device according to the present invention includes a case, a positive characteristic thermistor element and a plurality of terminal members.

The internal space in the case is divided into first housing portions and a second housing portion. There are a plurality of the aforementioned first housing portion, the number of which corresponds to the number of the aforementioned terminal members. The second housing portion constitutes a space that is cut off from the first housing portions by a partitioning wall.

The positive characteristic thermistor element is housed in the second housing portion.

At least two of the terminal members are provided, each with a contact terminal portion, a conductive portion and a lead-out terminal portion. The contact terminal portion, which is positioned inside the second housing portion is in contact with one of the electrodes of the positive characteristic thermistor element. The conductive portion is electrically continuous to the contact terminal portion and it is also led to one of the first housing portions through the partitioning wall mentioned above. The lead-out terminal portion, which is positioned inside one of the aforementioned first housing portions is electrically connected to the conductive portion and is led out to the outside at one of the first housing portions.

As described above, the internal space of the case is divided into the first housing portions and the second housing portion. The second housing portion constitutes a space that is cut off from the first housing portions by a partitioning wall and the positive characteristic thermistor element is housed in the second housing portion. Thus, the positive characteristic thermistor element is provided in an environment that is cut off from the atmospheres of the first housing portions.

At least two terminal members are provided each with a contact terminal portion, a conductive portion and a lead-out terminal portion. The contact terminal portion is positioned in the second housing portion, in contact with one of the electrodes of the positive characteristic thermistor element. The conductive portion is electrically continuous to the contact terminal portion. The lead-out terminal portion is electrically connected to the conductive portion. As a result, the electrodes of the positive characteristic thermistor element are electrically connected to the lead-out terminal portions via the contact terminal portions and the conductive portions.

The lead-out terminal portions are provided in the first housing portions and are led out to the outside at the first housing portions. Consequently, the terminal members are electrically connected to an external device at the first housing portions.

In this structure, the second housing portion constitutes a space which is cut off from the first housing portions by the partitioning wall and the positive characteristic thermistor element is housed in the second housing portion. Because of this, even when the outside air, which contains corrosive gases such as chlorine gas, moisture or drops of water, enters the first housing portions where the lead-out terminal portions are provided, corrosive gases such as chlorine gas, moisture or drops of water are prevented from entering the second housing portion where the positive characteristic thermistor element is provided. With this, degradation of the positive characteristic thermistor element and the electrode portions, corrosion or contact failure, are reliably prevented.

While the conductive portion of each of the terminal members is led to the first housing portions through the partitioning wall which partitions the first housing portions from the second housing portion, the area of the partitioning wall through which the conductive portions pass can be sealed easily and reliably. As a result, corrosive gases such as chlorine gas, moisture or drops of water are prevented from entering the second housing portion from the first housing portions through the area of the partitioning wall where the conductive portions pass.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
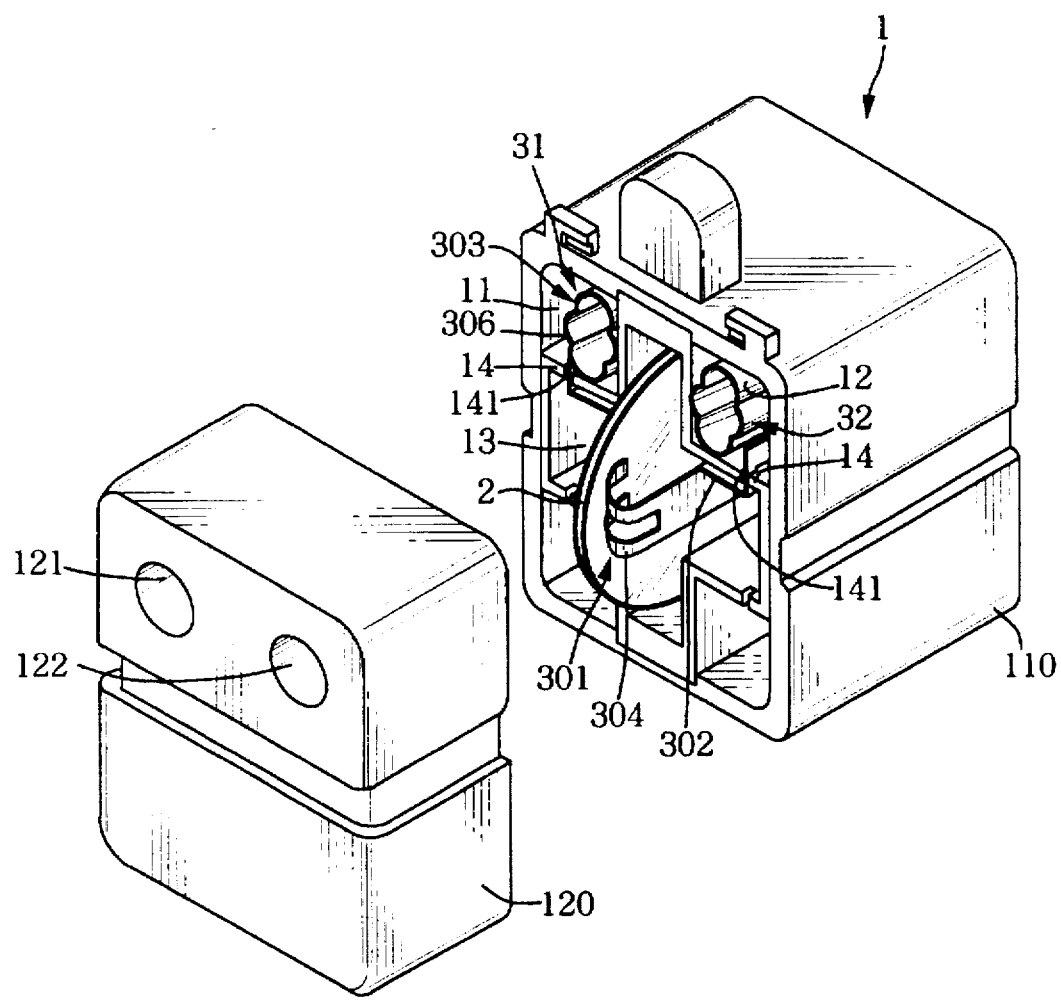
FIG. 1 is an exploded perspective of the positive characteristic thermistor device according to the present invention.
Figure 2:
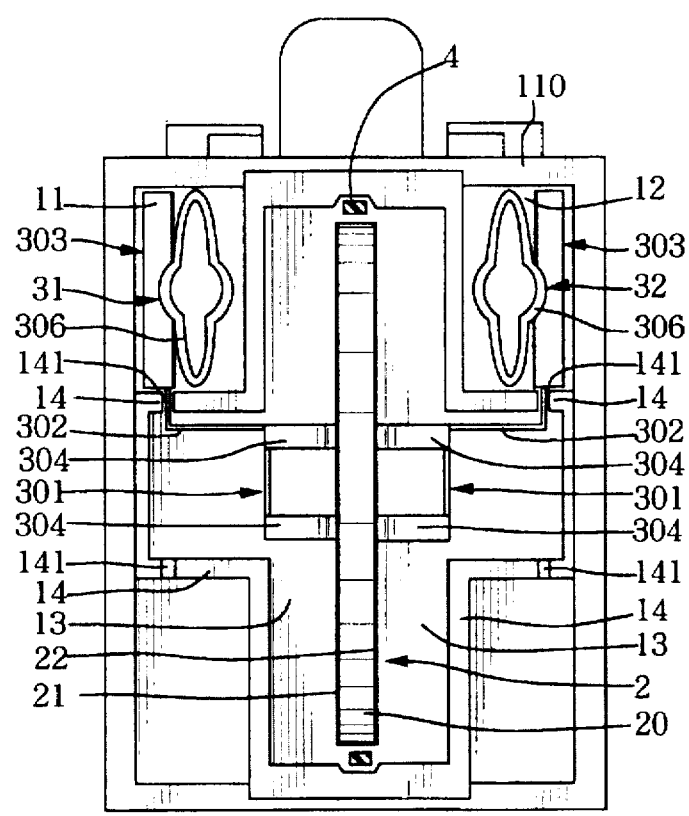
FIG. 2 is a plan view of the first casing member of the positive characteristic thermistor device shown in FIG. 1.
Figure 3:
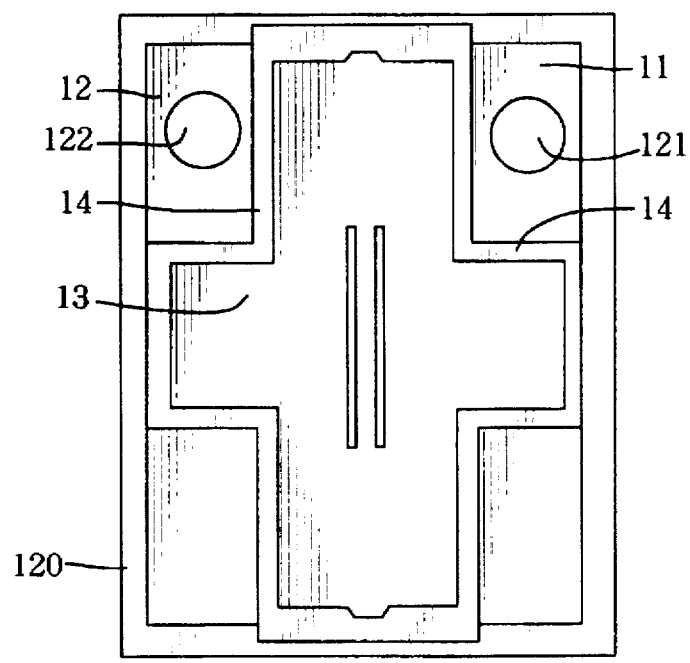
FIG. 3 is a plan view of the second casing member of the positive characteristic thermistor device shown in FIG. 1.

In reference to FIGS. 1 and 2, the positive characteristic thermistor device according to the present invention includes a case 1, a positive characteristic thermistor element 2 and a plurality of terminal members 31 and 32.

The internal space of the case 1 is divided into first housing portions 11 and 12 and a second housing portion 13. There are a plurality of first housing portions 11 and 12, the number of which corresponds to the number of the terminal members 31 and 32. The second housing portion 13 constitutes a space that is cut off from the first housing portions 11 and 12 by a partitioning wall 14.

The positive characteristic thermistor element 2 is housed in the second housing portion 13. The structure, characteristics and the like of the positive characteristic thermistor element 2 are well known to persons skilled in the field. A typical positive characteristic thermistor element will have a structure in which electrodes 21 and 22 are formed on a substrate 20, which is constituted of a barium titanate semiconductor ceramic (see FIG. 2). The shape of the substrate 20 may be either disk-like or rectangular. The electrodes 21 and 22 are provided in such a manner that they form an ohmic contact with the substrate 20. The electrodes 21 and 22 may be formed, for instance, through Ni electroless deposition or they may be formed by coating an electrode material whose main constituent is Ag, through means such as printing. Such electrode forming technology is known to persons skilled in the field.

The terminal members 31 and 32 are each provided with a contact terminal portion 301, a conductive portion 302 and a lead-out terminal portion 303. The contact terminal portions 301, which are positioned in the second housing portion 13, are in contact with the electrodes 21 and 22 of the positive characteristic thermistor element 2. The conductive portions 302 are electrically continuous with the contact terminal portions 301 and are led to the first housing portions 11 and 12 through the partitioning wall 14. The lead-out terminal portions 303, which are positioned in the first housing portions 11 and 12, are electrically connected to the conductive portions 302 and are led out to the outside at the first housing portions 11 and 12.

The terminal members 31 and 32 may be constituted by, for instance, performing Ni plating on base bodies constituted of Cu—Ti alloy, stainless steel or the like. Such terminal members 31 and 32, apart from having the degree of electrical conductivity and thermal conductivity required in this type of positive characteristic thermistor device, also have excellent anticorrosive properties against chlorine gas, moisture and water drops. Although, in this embodiment, at least two terminal members 31 and 32 are provided to make electrical contact with the electrodes 21 and 22 of the positive characteristic thermistor element 2, there may be more than two terminal members, depending upon the electric circuit that is needed.

As described above, the internal space of the case 1 is divided into the first housing portions 11 and 12 and the second housing portion 13, the second housing portion 13 constitutes a space that is cut off from the first housing portions 11 and 12 by the partitioning wall 14 and the positive characteristic thermistor element 2 is housed in the second housing portion 13. As a result, the positive characteristic thermistor element 2 is positioned within an environment that is cut off from the atmospheres in the first housing portions 11 and 12.

The contact terminal portions 301 of the terminal members 31 and 32 are positioned within the second housing portion 13 while in contact with the electrodes 21 and 22 of the positive characteristic thermistor element 2. The conductive portions 302 are electrically continuous to the contact terminal portions 301 and the lead-out terminal portions 303 are electrically connected to the conductive portions 302. As a result, the electrodes 21 and 22 of the positive characteristic thermistor element 2 are electrically connected to the lead-out terminal portions 303 via the contact terminal portions 301 and the conductive portions 302.

The lead-out terminal portions 303 are positioned in the first housing portions 11 and 12 and are led out to the outside at the first housing portions 11 and 12. Consequently, the terminal members 31 and 32 are electrically connected to an external device such as the compressor of a refrigerator at the first housing portions 11 and 12.

In this structure, the second housing portion 13 constitutes a space that is cut off from the first housing portions 11 and 12 by the partitioning wall 14 and the positive characteristic thermistor element 2 is housed in the second housing portion 13. Because of this, even when the external atmosphere containing corrosive gases such as chlorine gas, moisture or water drops enters the first housing portions 11 and 12 where the lead-out terminal portions 303 are positioned, the corrosive gases such as chlorine gas, moisture or water drops are prevented from entering the second housing portion 13 where the positive characteristic thermistor element 2 is positioned. Thus, degradation and corrosion of the positive characteristic thermistor element 2 and the electrodes 21 and 22 and contact failure between the electrodes 21 and 22 and the contact terminal portions 301 are reliably prevented.

The terminal members 31 and 32 in the figures are each provided with a spring contact piece 304 at the contact terminal portions 301. The spring contact pieces 304 are in spring contact with the electrodes 21 and 22 of the positive characteristic thermistor element 2. The shape and structure of the spring contact pieces 304 are not limited to those shown in the figures and may take a variety of forms. The conductive portions 302 are led from the second housing portion 13 to the first housing portions 11 and 12 via notched portions 141 provided in the partitioning wall 14. The structure in which the conductive portions 301 are led from the second housing portion 13 to the first housing portions 11 and 12 is not limited to the notched portions 141 mentioned above, but a structure in which a stage is provided at the end surface of the partitioning wall 14 or a structure in which a hole is bored in the partitioning wall 14 to led out the conductive portions 302 through the hole, for instance, may be adopted.

Figure 4:
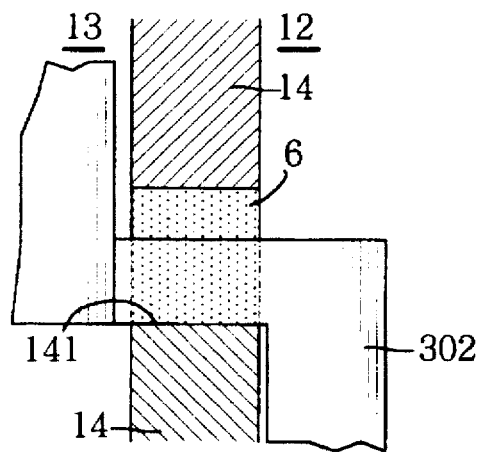
FIG. 4 is a partial cross section of the positive characteristic thermistor device according to the present invention illustrated in FIGS. 1 to 3, showing a structure in which the terminal member is led out.
Figure 5:
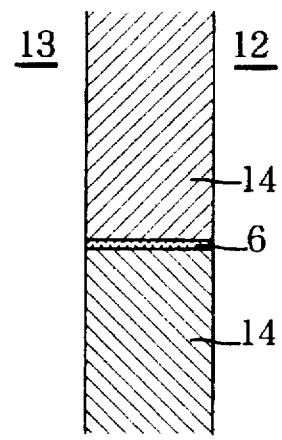
FIG. 5 is a partial cross section of the positive characteristic thermistor device according to the present invention illustrated in FIGS. 1 to 3, showing a structure in which the first casing member and the second casing member are bonded to each other.

The notched portions 141 are sealed, so that corrosive gases such as chlorine gas, moisture or water drops are even more reliably prevented from entering the second housing portion 13 from the first housing portions 11 and 12 through the notched portions 141 perforating the partitioning wall 14 through which the conductive portions 301 pass. The sealing structure can be realized by filling the notched portions 141 with a sealant 6, as shown in FIG. 4. A desirable sealant 6 will be a material that hardens at normal temperatures or when heated, maintains its sealing function over time and has outstanding heat resistance, chemical resistance and adhering properties. A specific example of such a sealant is an epoxy resin, a silicon type resin or the like. The sealant can be applied by means such as screen printing or coating with a dispenser.

In this embodiment, the case 1 is constituted of an insulating resin. The partitioning wall 14 is also constituted of an insulating resin and is formed as a unit with the case. In addition, the case 1 includes a first casing member 110 and a second casing member 120, each of which represents roughly half of the case. The first casing member 110 and the second casing member 120 are coupled.

The first casing member 110 and the second casing member 120 are both provided with a partitioning wall 14. The notched portions 141 may be provided only in either the partitioning wall 14 of the first casing member or in the partitioning wall 14 of the second casing member 120. In the figures, the notched portions 141 are provided only in the partitioning wall 14 of the first casing member 110 and no notched portions are formed in the partitioning wall 14 of the second casing member 120. This structure improves the sealing function in the coupling portions of the first casing member 110 and the second casing member 120.

Figure 6:
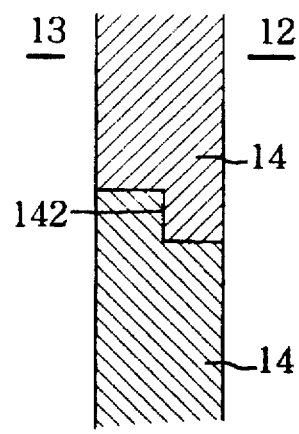
FIG. 6 is a partial cross section of the positive characteristic thermistor device according to the present invention illustrated in FIGS. 1 to 3, showing a structure in which the first casing member and the second casing member are coupled.
Figure 7:
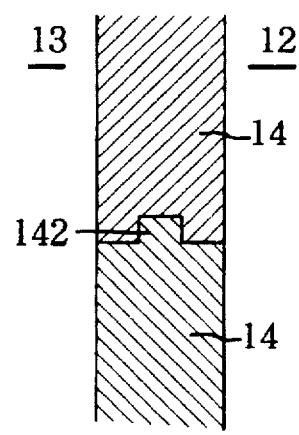
FIG. 7 is another partial cross section of the positive characteristic thermistor device according to the present invention illustrated in FIGS. 1 to 3, showing another structure in which the first casing member and the second casing member are coupled.
Figure 8:
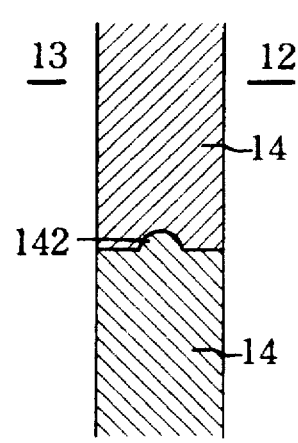
FIG. 8 is a partial cross section of the positive characteristic thermistor device according to the present invention illustrated in FIGS. 1 to 3, showing yet another structure in which the first casing member and the second casing member are coupled.

The partitioning walls 14 of the first and second casing members 110, 120 may be coupled by employing a structure 142 in which a projection formed on the end surface of the partitioning wall 14 of the first casing member 110 is fitted into a recess formed on the end surface of the partitioning wall 14 of the second casing member 120, as shown in FIGS. 6 to 8.

In the structure described above, corrosive gases such as chlorine gas, moisture or water drops do not enter the second housing portion 13 where the positive characteristic thermistor element 2 is positioned, via the coupling surface of the first casing member 110 and the second casing member 120, nor do they enter the second housing portion 13 from the first housing portions 11 and 12 through the area of the partitioning wall 14 where the conductive portions 302 pass through.

The first casing member 110 and the second casing member 120 are both provided with a partitioning wall 14. The notched portions 141 may be provided only in either the partitioning wall 14 of the first casing member or in the partitioning wall 14 of the second casing member 120. In the figures, the notched portions 141 are provided only in the partitioning wall 14 of the first casing member 110 and no notched portions are formed in the partitioning wall 14 of the second casing member 120. This structure improves the sealing function in the bonding interface of the first casing member 110 and the second casing member 120.

Inside the case 1, additional members, including an insulating plate 4 which is constituted of mica or the like for positioning the positive characteristic thermistor element 2 are provided. In FIG. 1, the second casing member 120 is provided with holes 121 and 122. These holes 121 and 122 are used for inserting contacts provided in a external device such as a compressor.

Figure 9:
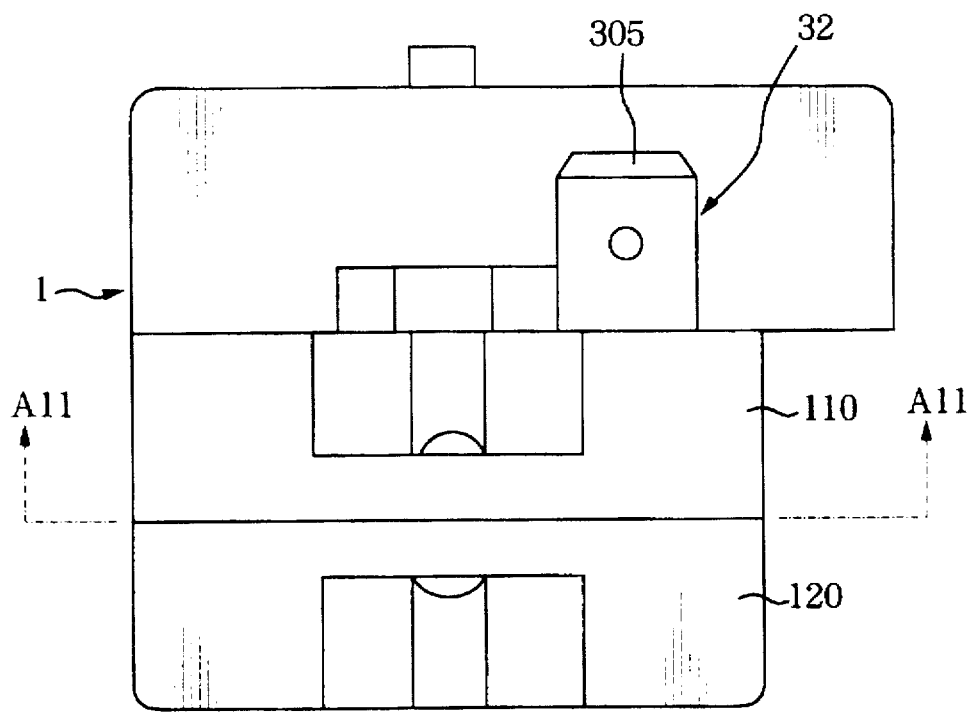
FIG. 9 is a front view of another embodiment of the positive characteristic thermistor device according to the present invention.
Figure 10:
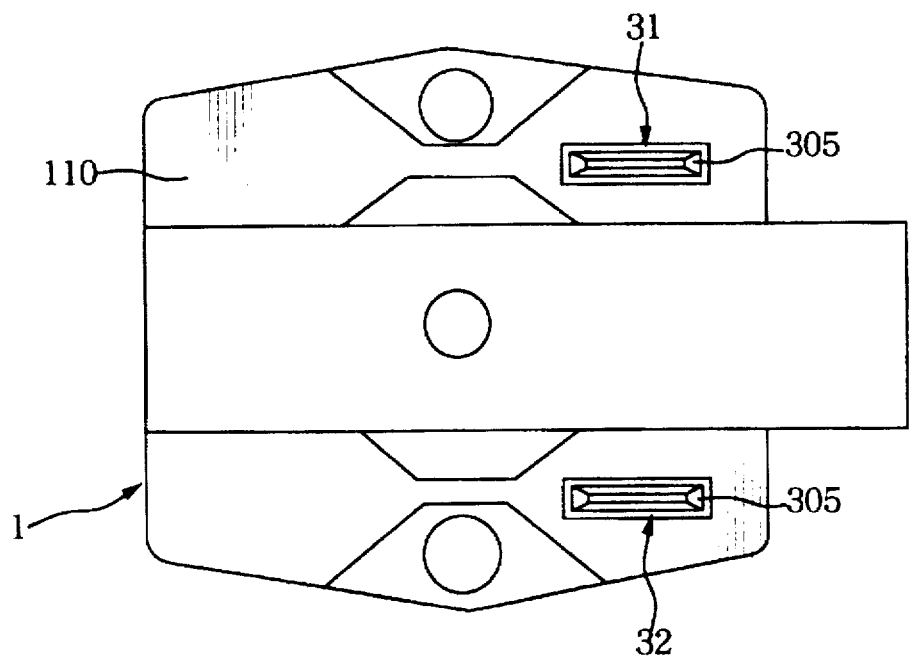
FIG. 10 is a plan view of the positive characteristic thermistor device shown in FIG. 9.
Figure 11:
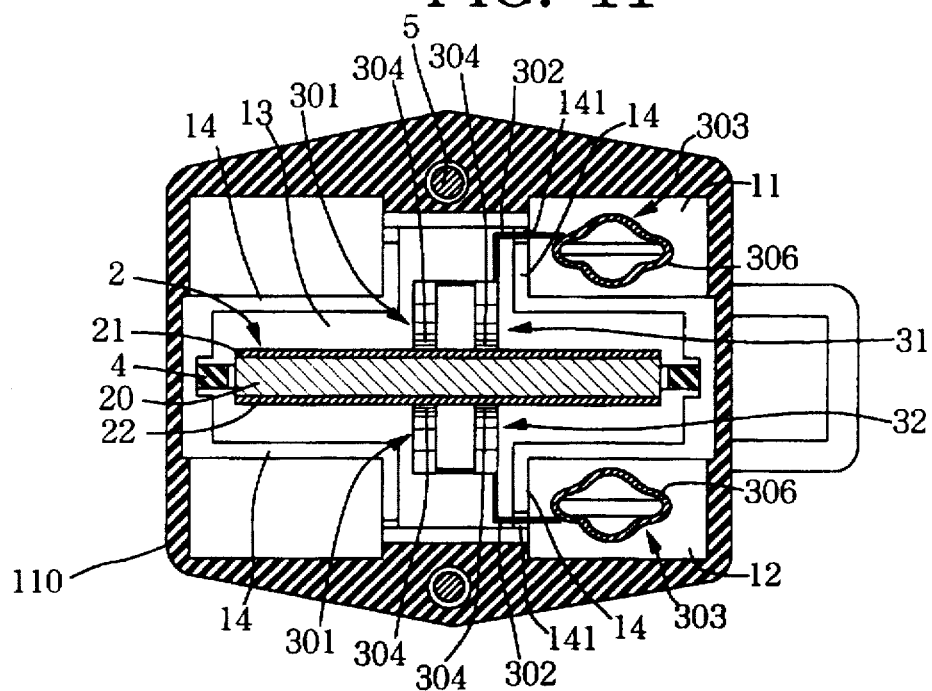
FIG. 11 is a partial cross section of FIG. 9 through line A11—A11.

Providing the first housing portions 11 and 12 and the second housing portion 13 with the partitioning wall 14 is a feature unique to the present invention. Other structural features can be achieved by adopting technology that has been previously disclosed. Next, a detailed explanation of the present invention including terminal members 31, 32 which terminal members are adopted cooperate with contacts associated with a device operating in accordance with the technology disclosed in the Japanese Unexamined Utility Model Publication (KOKAI) No. 73903/1993. In FIGS. 9 to 11, a case 1 constituted of an insulating resin is divided into a first casing member 110 and a second casing member 120 which are joined to each other. In addition, the first casing member 110 and the second casing member 120 are bonded to each other with a sealing resin applied to the bonding surface.

A positive characteristic thermistor 2 is positioned inside the second housing portion 13 in the case 1. The positive characteristic thermistor 2 is positioned inside a hole bored in an insulating plate 4 and in this state, it is positioned within the second housing portion 13. The outer edges of the insulating plate 4 are fitted in a groove formed in the internal surface of the case 1.

Figure 12:
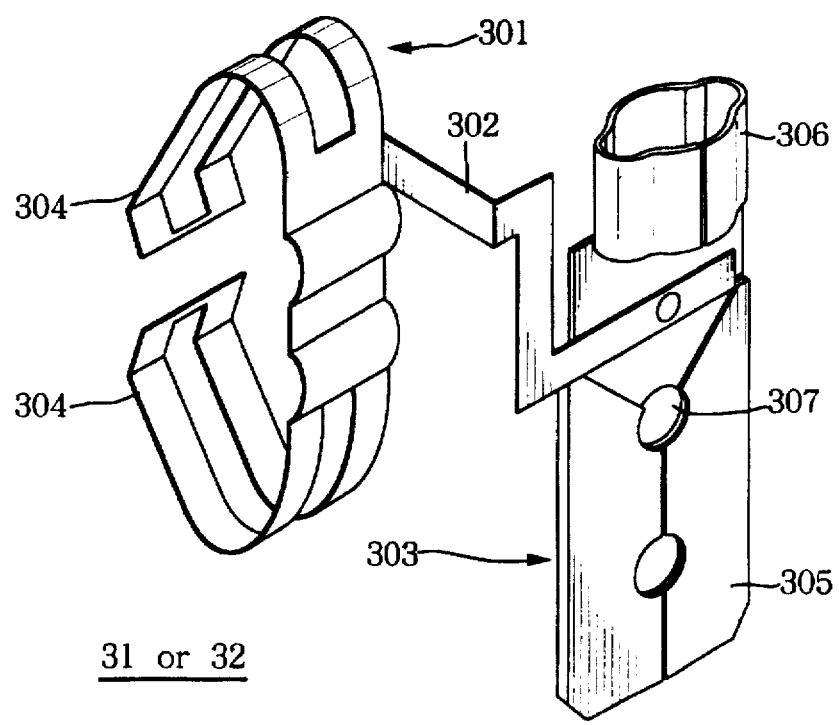
FIG. 12 is a perspective of a terminal member used in the positive characteristic thermistor device shown in FIG. 9.

FIG. 12 shows the precise structure of a terminal member 31 or 32. In the figure, the lead-out terminal portion 303, which constitutes either the terminal member 31 or 32, is provided with a plug portion 305. The plug portion 305, in turn, is provided with holes 307 which pass through the plug portion. The lead-out terminal portion 303 is provided with a socket portion 306 in addition to the plug portion 305. The lead-out terminal portion 303 is constituted by forming the socket portion 306, and the plug portion 305 on the two ends of one metal plate by machining and securing the conductive portion 302 part way between the socket portion 306 and the plug portion 305 by means for joining, such as welding. The terminal member 31 or 32 may consist of one single component of which the contact terminal portion 301, the conductive portion 302 and the lead-out terminal portion 303 are integrated by performing press workings on a metal plate.

The lead-out terminal portions 303 of the terminal members 31 and 32 are positioned in the first housing portions 11 and 12. The spring contact pieces 304, constituting the contact terminal portions 301, press in contact with the electrodes 21 and 22 of the positive characteristic thermistor 2 under their own spring pressure. The socket portion 306 provided at each lead-out terminal portion 303 is exposed almost at the external end surface of the case 1 while the plug portion 305 is led out to the outside of the case 1.

The terminal members 31 and 32 may be constituted of stainless steel, phosphor bronze, Cu—Ti alloy or the like. The spring contact pieces 304, too, may be constituted of Cu—Ti alloy as part of the socket portions 306 and the plug portions 305, or as separate members.

Figure 13:
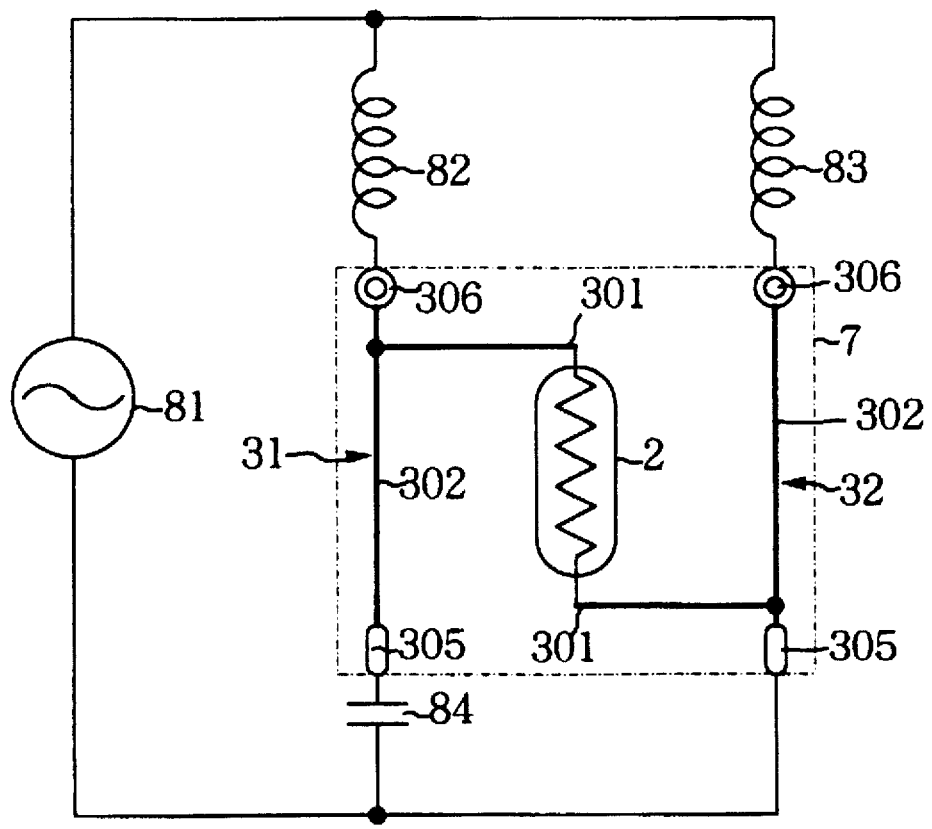
FIG. 13 is a diagram of a motor start-up circuit which employs the positive characteristic thermistor device shown in FIGS. 1 to 12.

FIG. 13 is an electric circuit diagram of a motor start-up circuit which employs the positive characteristic thermistor device shown in FIGS. 1 to 12. In the figure, reference number 7 indicates the positive characteristic thermistor device, reference number 81 indicates a power source, reference numbers 82 and 83 indicate motor coils and reference number 84 indicates a phase advancing capacitor. The socket portion 306 of the terminal member 31 is connected to one end of the coil 82 with its plug portion 305 connected to one end of the capacitor 84. The socket portion 306 of the terminal member 32 is connected to one end of the coil 83 with the plug portion 305 connected to the other end of the capacitor 84 and also to the power source 81.

The quantity, structure and the like of the terminal members may change in many ways depending upon the structure of the motor start-up circuit, as disclosed in Japanese Examined Utility Model Publication No. 84722/1988 and Japanese Examined Patent Publication No. 18817/1988.

As has been explained, according to the present invention, a positive characteristic thermistor device with which it is possible to reliably prevent degradation, corrosion, contact failure and the like in the positive characteristic thermistor element and the electrode portions can be provided.

While the invention has been particularly shown and described with reference to preferred embodiments thereof, it will be understood by those skilled in the art that various changes in form and detail may be made therein without departing from the spirit and scope of the invention.

What is claimed is:

1. A positive characteristic thermistor device comprising:
   a positive characteristic thermistor element having at least two electrodes;
   at least two terminal members each including a contact portion, a conductive portion, and a lead-out portion, each said lead-out portion providing electrical contact with electrical devices exterior to the positive characteristic thermistor device;
   a case for housing the positive characteristic thermistor element and the at least two terminal members;
   wherein the case further comprises:
   at least two housing portions each housing one lead-out portion and one associated first segment of the conductive portion electrically coupled to the housed lead-out portion,
   a hermetic compartment housing the positive characteristic thermistor element along with at least two second segments of each conductive portion, each of the at least two second segments being electrically coupled to one of the electrodes of the positive characteristic thermistor element,
   a partition wall inside said case forming at least part of the compartment and separating the compartment from the at least two housing portions, and
   said partition wall containing notches providing at least two passages for a third coupling segment of each conductive portion serving to interconnect each of the first segments in each of the at least two housings with each of the second segments in the compartment, and
   a sealant provided in each of the notches to completely fill any spaces in the notches to prevent any intrusion of exterior contaminates into the compartment from the housing portions.

2. The positive characteristic thermistor device according to claim 1, wherein:
   each of said contact terminal portions are provided with a spring contact piece which is in contact with each of said electrodes of said positive characteristic thermistor element.

3. The positive characteristic thermistor device according to claim 1 wherein:
   said notched portion is sealed with a resin adhesive.

4. The positive characteristic thermistor device according to claim 1 wherein:
   said case includes an insulating resin and said partition wall is formed as part of said case.

5. The positive characteristic thermistor device according to claim 1 wherein:
   said case includes a first casing member and a second casing member, each constituting half of said case, said case being formed by coupling said first casing member to said second casing member.

6. The positive characteristic thermistor device according to claim 5, wherein:
   said first casing member and said second casing member each include half said partition wall, said housing portions and said compartment, respectively, in corresponding mateable positions within said first casing member and said second casing member.

7. The positive characteristic thermistor device according to claim 6, wherein:
   the partition walls provided in said first casing member and said second casing member have end surfaces which come into contact with each other when the casing members are joined to form the case.

8. The positive characteristic thermistor device according to claim 6, wherein:
   the end surfaces of said partition walls provided in said first casing member and said second casing member are bonded to each other with a sealant resin to join the first casing member and second casing member into said case.

* * * * *